United States Patent
Favero et al.

(10) Patent No.: US 10,407,324 B2
(45) Date of Patent: Sep. 10, 2019

(54) METHOD FOR TREATING SUSPENSIONS OF SOLID PARTICLES IN WATER USING COMB LIKE POLYMERS

(71) Applicant: S.P.C.M. SA, Andrezieux Boutheon (FR)

(72) Inventors: Cédrick Favero, Saint Romain le Puy (FR); Morgan Tizzotti, Lyons (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 226 days.

(21) Appl. No.: 15/309,968

(22) PCT Filed: Apr. 24, 2015

(86) PCT No.: PCT/EP2015/058869
§ 371 (c)(1),
(2) Date: Nov. 9, 2016

(87) PCT Pub. No.: WO2015/180900
PCT Pub. Date: Dec. 3, 2015

(65) Prior Publication Data
US 2017/0166463 A1    Jun. 15, 2017

(30) Foreign Application Priority Data
May 30, 2014    (EP) .................................. 14305816

(51) Int. Cl.
*C02F 1/56* (2006.01)
*B09B 3/00* (2006.01)
(Continued)

(52) U.S. Cl.
CPC ................. *C02F 1/56* (2013.01); *B09B 3/00* (2013.01); *B09B 3/0025* (2013.01); *B09B 5/00* (2013.01);
(Continued)

(58) Field of Classification Search
CPC ........ C02F 1/56; C02F 2103/10; C02F 11/14; B09B 3/0025; B09B 5/00; B09B 3/00;
(Continued)

(56) References Cited

U.S. PATENT DOCUMENTS 3,418,237 A * 12/1968 Booth ..................... B01D 21/01
                                                                209/5
3,707,523 A * 12/1972 Ledden ................... C09K 17/22
                                                                210/734
(Continued)

FOREIGN PATENT DOCUMENTS

| CA | 1273888 A | 9/1990 |
|----|-----------|--------|
| CA | 2407869 A1 | 12/2001 |

(Continued)

OTHER PUBLICATIONS

International Search Report and Written Opinion issued in PCT/EP2015/058869, dated Jun. 3, 2015.

*Primary Examiner* — Pamela H Weiss
(74) *Attorney, Agent, or Firm* — Heslin Rothenberg Farley & Mesiti P.C.

(57) ABSTRACT

The invention relates to a method for treating an aqueous suspension of solid particles, wherein at least one water-soluble polymer is added to the suspension, and wherein said polymer is obtained by polymerizing at least a non-ionic monomer, optionally at least one anionic and/or at least one cationic monomer, in the presence of a multifunctional free radical transfer agent. This method is particularly useful for the treatment of mineral tailings and especially for tailings resulting from oil sand extraction.

16 Claims, 1 Drawing Sheet

(51) Int. Cl.
  *C08F 261/04* (2006.01)
  *B09B 5/00* (2006.01)
  *C01B 11/00* (2006.01)
  *C08F 263/04* (2006.01)
  *C02F 11/14* (2019.01)
  *C08F 218/08* (2006.01)
  *C08F 220/56* (2006.01)
  *C02F 103/10* (2006.01)

(52) U.S. Cl.
  CPC .............. *C01B 11/00* (2013.01); *C02F 11/14* (2013.01); *C08F 261/04* (2013.01); *C08F 263/04* (2013.01); *C02F 2103/10* (2013.01); *C08F 218/08* (2013.01); *C08F 220/56* (2013.01)

(58) Field of Classification Search
  CPC .... C08F 220/56; C08F 261/04; C08F 263/04; C08F 218/08; C01B 11/00
  See application file for complete search history.

(56) References Cited

U.S. PATENT DOCUMENTS

| | | | |
|---|---|---|---|
| 4,347,140 A | | 8/1982 | Alsthom-Atlantique |
| 6,217,778 B1* | | 4/2001 | Shing .................... C02F 1/5245 162/189 |
| 2004/0024156 A1* | | 2/2004 | Quadir ...................... C01F 7/47 526/303.1 |
| 2011/0160348 A1* | | 6/2011 | Suau .................... B01F 17/0028 524/3 |
| 2011/0269887 A1* | | 11/2011 | Gane ...................... C09C 1/021 524/425 |
| 2012/0058922 A1* | | 3/2012 | Favero ................... C08K 5/005 507/226 |
| 2014/0238943 A1* | | 8/2014 | Favero ...................... C02F 1/56 210/734 |

FOREIGN PATENT DOCUMENTS

| | | |
|---|---|---|
| CA | 2515581 A1 | 7/2004 |
| CA | 2682542 A1 | 4/2010 |
| EP | 0955315 A1 | 11/1999 |
| WO | 9605146 A1 | 2/1996 |
| WO | 2008107492 A1 | 9/2008 |

\* cited by examiner

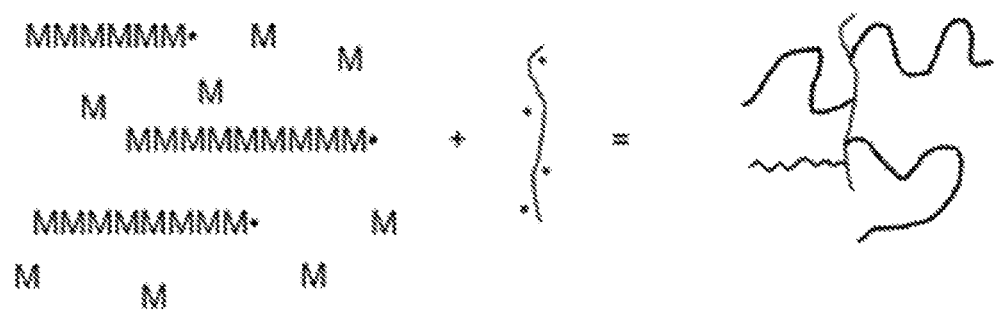

METHOD FOR TREATING SUSPENSIONS OF SOLID PARTICLES IN WATER USING COMB LIKE POLYMERS

CROSS REFERENCE TO RELATED APPLICATIONS

This application is a national stage filing under section 371 of International Application No. PCT/EP/2015/058869, filed on Apr. 24, 2015, and published on Dec. 3, 2015 as WO 2015/180900 A1, and claims priority to European Application No. 14305816.2, filed on May 30, 2014.

FIELD OF THE INVENTION

The invention relates to a method for treating a suspension of solid particles in water, such as mineral tailings. This method includes the step of contacting the suspension of solid particles in water with a specific water-soluble polymer. The method consists of adding said specific polymer into a thickener containing the tailings to treat, and/or during transport of said suspension to a deposition area for dewatering and solidification, or to the tailings to treat followed by a mechanical treatment such as centrifugation, screw press and filtration.

BACKGROUND OF THE INVENTION

The invention relates to a method for treating suspensions of solid particles in water. More precisely, the invention relates to a method for treating suspension of solid particles in water with a water-soluble polymer which has a comb structure and a specific composition.

Suspensions of solid particles in water include all types of sludge, tailings, or waste materials. The suspensions may result from mineral ores processes. They are for instance industrial sludge or tailings and all mine wash and waste products resulting from exploiting mines, such as, for example, coal mines, diamonds mines, phosphate mines, metal mines (alumina, platinum, iron, gold, copper, silver, etc. . . . ). Suspensions can also result from drilling mud or tailings derived from the treatment of oil sand. These suspensions of solid particles generally comprise organic and/or mineral particles such as for instance clays, sediments, sand, metal oxides, oil, etc. . . . , mixed with water.

The treatment of such tailings and other waste material has become a technical, environmental and public policy issue.

It is common practice to use synthetic or natural polymers such as coagulants and flocculants to separate the solids from the liquid.

For a long time, and even nowadays, mineral sludge produced by physical or chemical ore treatment methods were stored above ground in retention lagoons, ponds, dam or embankments in semi-liquid form. These large volumes of stored sludge therefore create a real hazard, especially if the dikes break.

Since the traditional storage solutions are obviously dangerous, more and more national regulations have been issued forbidding abandoning these zones. The regulations also call for an obligation to rehabilitate such sites, i.e. treating and consolidating, or requiring strict authorizations more and more difficult to fulfill.

The improvement of chemical and mechanical treatments of tailings or sludge is therefore a great challenge that needs to be addressed.

Various attempts were made in the past decades to increase the settling rate of the tailings in order to efficiently recycle water and reduce the volume of tailings ponds. The main physical treatments include centrifugation, filtration, electrophoresis and electro-coagulation.

On the other hand, chemical methods are emerging. They include process involving the addition of chemicals such as sodium silicate, organic flocculants, inorganic coagulants, oxidizing and reducing agents and more recently carbon dioxide.

In 1979-1980, Alsthom Atlantique and SNF (U.S. Pat. No. 4,347,140) developed a multistep flocculation system (super-flocculation) specifically designed for treating clay lagoons from phosphate production in Florida.

The treatment of suspensions was continuously studied in 1986 according to the method described in CA 1,273,888, then in 1994 in document WO 96/05146, in 2000 in document CA 2,407,869 and in 2004 in document CA 1,515,581.

In document CA 2 682 542, the process involves the addition of polymers modified by copolymerization and/or branching. Polymers having hydrophobic groups which have also been studied showed some improvement.

Despite great advances over the last 10 years, there is still a need to develop polymers that may enhance the speed and amount of water released from the tailings. Improvement of the physical characteristics of the produced sludge is also sought.

SUMMARY OF THE INVENTION

The present invention addresses the above needs by providing a process for improving the treatment of suspensions of solid particles in water thanks to specific water-soluble polymers.

Accordingly, the invention provides a method for treating a suspension of solid particles in water, including, contacting the said suspension with a water-soluble polymer. Due to its synthesis, this polymer has a comb like structure and a specific composition.

According to the invention, it was surprisingly found that the use of these polymers significantly improves the performances of tailing treatments such as:
- tailing concentration in a thickener, or
- dewatering stage and the drying and solidification stages of the suspensions of solid particles in water, or
- mechanical treatment of treated tailings.

The use of these polymers increases the drainage, water release and general dewatering of the tailings. It also improves the floc resistance and the clarity of the released fluid (also called the liquor) that allows the clarified water to be reused and made immediately available for recirculation in the plant. The treated suspension solidifies much faster, which results in improved dry sludge properties.

DETAILED DESCRIPTION OF THE INVENTION

The invention relates to a method for treating an aqueous suspension of solid particles, wherein at least one water-soluble polymer is added to the suspension, and wherein said polymer is obtained by polymerizing:
- at least one non-ionic monomer;
- optionally at least one anionic and/or at least one cationic monomer;
- in the presence of between 0.05 and 10% by weight, of at least one (preferably one) multifunctional free radical transfer agent, said weight percentage being related to the total amount of monomers.

More specifically, the invention relates to a method for treating an aqueous suspension of solid particles, comprising the following steps:

preparing a water-soluble polymer by polymerizing:
at least one non-ionic monomer;
optionally at least one anionic and/or at least one cationic monomer;
in the presence of from between 0.05% and 10% by weight, of at least one (preferably one) multifunctional free radical transfer agent, said weight percentage being related to the total amount of monomers;
adding said water-soluble polymer to the aqueous suspension of solid particles.

The multifunctional free radical transfer agent is a polymer having a molecular weight ranging from between 2.000 g/mol and 500.000 g/mol.

It has been found that the said polymer permits to treat more efficiently suspensions of solids. More precisely, the specific structure of the polymer and its chemical composition lead to a range of polymers which are very efficient as flocculant agents that are able to treat aqueous suspension of solid particles. The structure of the polymer results from the polymerization conditions of the monomer(s), and especially the presence of a multifunctional free radical transfer agent.

The multifunctional free radical transfer agent is a polymer having a plurality of chemical functions able to transfer with several free radicals during the polymerization of the monomer(s). The multifunctional free radical transfer agent is preferably water-soluble in order to react with the monomer(s) and the polymeric chains in formation or already formed.

Advantageously, the multifunctional free radical transfer agent has a molecular weight comprised between 10.000 and 500.000 g/mol, more preferably between 50.000 and 500.000 g/mol, even more preferably between 80.000 and 500.000 g/mol, and very preferably between 100.000 and 500.000 g/mol.

According to a preferred embodiment, the amount of multifunctional free radical transfer agent is comprised between 0.1% and 6% by weight, more preferably between 1% and 4% by weight as compared to the total weight of the monomer(s).

According to another preferred embodiment, the multifunctional free radical transfer agent can be selected from the group consisting of polyamine, polyvinyl alcohol, polyvinyl alcohol copolymer, hydrolyzed vinyl acetate-based polymer, hydrolyzed vinyl acetate-based copolymer, polythiol, polyether imine, polycarboxylic acid, salts of polycarboxylic acid, and polyaldehyde.

The multifunctional free radical transfer agent is preferably selected from the group consisting of polyvinyl alcohol, polyvinyl alcohol copolymer, hydrolyzed vinyl acetate-based polymer, and hydrolyzed vinyl acetate-based copolymer.

In a particular preferred embodiment, the multifunctional free radical transfer agent is a partially hydrolyzed vinyl acetate-based polymer or a partially hydrolyzed vinyl acetate-based copolymer. These polymer and copolymer comprise vinyl acetate functions and vinyl alcohol functions due to the partially hydrolyzed vinyl acetate.

The partial hydrolysis of the polyvinyl acetate (PVAc) results in the formation of a polyvinyl alcohol (PVOH). More specifically, the PVAc is transesterified, mainly with methanol (methanolysis), in order to afford PVOH and methyl acetate. The hydrolysis of PVAc can also be carried out by acid hydrolysis or by basic hydrolysis, thereby making it possible to produce polymers with more or less random tacticity.

The hydrolysis percentage of the polyvinyl acetate corresponds to the number of moles of vinyl acetate that have been hydrolyzed (i.e. number of acetate units that have been replaced with an —OH unit) divided by the sum of the number of moles of hydrolyzed vinyl acetate plus the number of moles of non-hydrolyzed vinyl acetate. Depending on the degree/percentage of hydrolysis, the resulting polymer comprises along its macromolecular chain, a certain proportion of alcohol functions and ester functions.

According to a preferred embodiment, the degree of hydrolysis of the partially hydrolyzed polyvinyl acetate based polymer or copolymer ranges from between 60% and 99%, preferably from between 80% and 95%.

According to a preferred embodiment, the above preferred multifunctional free radical transfer agent comprises other ionic and/or non-ionic monomers and therefore forms a copolymer. In practice, the co-monomers are added during the polymerization of the vinyl acetate monomer.

The non-ionic monomer may be chosen from the group consisting of acrylamide; N-isopropylacrylamide; N,N-dimethylacrylamide; N-vinylformamide; and N-vinylpyrrolidone. A preferred non-ionic monomer is acrylamide.

The cationic monomer may be chosen from the list comprising quaternized dimethylaminoethyl acrylate (ADAME); quaternized dimethylaminoethyl methacrylate (MADAME); dimethyldiallylammonium chloride (DADMAC); acrylamidopropyltrimethylammonium chloride (APTAC); and methacrylamidopropyltrimethylammonium chloride (MAPTAC).

The anionic monomer may be chosen from the list comprising acrylic acid; methacrylic acid; itaconic acid; crotonic acid; maleic acid; fumaric acid; monomers of strong acid type having, for example, a function of sulfonic acid or phosphonic acid type, such as 2-acrylamido-2-methylpropanesulfonic acid vinylsulfonic acid, vinylphosphonic acid, allylsulfonic acid, allylphosphonic acid, or styrenesulfonic acid; and water-soluble salts thereof. The water-soluble salts of the above anionic monomers are salts of an alkali metal, of an alkaline-earth metal, and of ammonium.

The multifunctional free radical transfer agent is more preferably an ionic partially hydrolyzed vinyl acetate-based copolymer, said ionic copolymer comprising:

between 1 and 40 mol % of at least one anionic monomer, preferably less than 10 mol %, more preferably less than 10 mol % relative to the total amount of monomers;
optionally at least one non-ionic monomer present at about 0 to 10 mol %, more preferably less than 5 mol % relative to the total amount of monomers.

As already said, the water soluble polymer used in the method according to the present invention is obtained in the presence of a multifunctional free radical transfer agent (0.05 to 10% by weight), upon polymerization of non-ionic monomers, and optionally anionic and/or cationic monomers which are described hereafter.

Non-ionic monomers are preferably selected from the group consisting of acrylamide; methacrylamide; N-mono derivatives of acrylamide; N-mono derivatives of methacrylamide; N,N derivatives of acrylamide; N,N derivatives of methacrylamide; acrylic esters; and methacrylic esters.

The most preferred non-ionic monomer is acrylamide.

Anionic monomers are preferably selected from the group consisting of monomers having a carboxylic function; salts of monomers having a carboxylic function; monomers having a sulfonic acid function; salts of monomers having a sulfonic acid function; monomers having a phosphonic acid function; and salts of monomers having a phosphonic acid function. They include for instance acrylic acid, acrylamide tertio butyl sulfonic acid, methacrylic acid, maleic acid, itaconic acid; and hemi esters thereof.

The most preferred anionic monomers are acrylic acid, acrylamide tertio butyl sulfonic acid (ATBS), and salts thereof.

Generally, any of the above mentioned salts of monomers are alkaline salts, alkaline earth salts, or ammonium salts.

Cationic monomers are preferably selected from the group consisting of dimethylaminoethyl acrylate (DMAEA) quaternized or salified; dimethylaminoethyl methacrylate (DMAEMA) quaternized or salified; diallyldimethyl ammonium chloride (DADMAC); acrylamidopropyltrimethylammonium chloride (APTAC); methacrylamidopropyltrimethylammonium chloride (MAPTAC).

Other monomers that can be used in the preparation of the water-soluble (co)polymer include for example N-vinyl pyrrolidone (NVP), and acryloymorpholine (ACMO).

Monomers having a hydrophobic character can also be used in the preparation of the water-soluble polymer used in the method of the invention. They are preferably selected from the group consisting of (meth)acrylic acid esters having an alkyl, arylalkyl or ethoxylated chain; derivatives of (meth)acrylamide having an alkyl, arylalkyl or dialkyl chain; cationic allyl derivatives; anionic or cationic hydrophobic (meth)acryloyl derivatives; and anionic or cationic monomers derivatives of (meth)acrylamide bearing a hydrophobic chain.

When a monomer having a hydrophobic character is used for the preparation of the water-soluble polymer, its amount ranges from between 0.001 and 1 mol % as compared the total amount of monomers.

The water-soluble polymer used in the method of the present invention may be cationic, amphoteric or anionic but is preferably anionic. The water-soluble polymer has an anionicity preferably ranging from between 10 to 55 mol %, and more preferably from 20 to 50 mol %.

In a preferred embodiment, the water-soluble polymer has an amount of non-ionic monomers of at least 30 mol %, preferably at least 45 mol %.

The molecular weight of the water-soluble (co)polymer is preferably comprised between 5 and 40 millions g/mol, and more preferably between 7 and 20 millions g/mol.

The water-soluble (co)polymer is structured thanks to the presence of the multifunctional free radical transfer agent. The structure is a comb-like structure with pending chains on the side of the multifunctional free radical transfer agent backbone (FIG. 1).

The water-soluble polymer may also be branched. Branching can preferably be carried out during the polymerization of the monomers, in the presence of a branching/crosslinking agent and possibly a transfer agent other than the multifunctional free radical transfer agent. A non-exhaustive list of branching/crosslinking agents includes: methylenebisacrylamide (MBA); ethylene glycol diacrylate; polyethylene glycol dimethacrylate; vinyloxyethyl acrylate; vinyloxyethyl methacrylate; triallylamine, glyoxal; compounds of the glycidyl ether type such as ethylene glycol diglycidyl ether; and compounds having at least one epoxy function.

The amount of branching/crosslinking agent in the monomer mixture is less than 1% in weight relative to the monomer content.

The method of polymerization can be carried out according to any polymerization techniques well known to a person skilled in the art: solution polymerization, suspension polymerization, gel polymerization, precipitation polymerization, emulsion polymerization (aqueous or reverse) followed or not by spray drying step, suspension polymerization, micellar polymerization followed or not by a precipitation step. Post-hydrolysis of the polymer of the invention is possible. Post-hydrolysis consists in reacting the hydrolysable functional group with a base.

It is essential that the multifunctional free radical transfer agent is added before or during the polymerization. According to a preferred embodiment, it is added to the monomers before starting the polymerization.

It is known that polymerization method leads to different polymers. For example the molecular weight or degree of linearity may vary, all ingredients being equal (monomers nature, monomers ratio, etc. . . . ).

It is also known that precipitation polymerization leads to the use of solvent which are not desired during the production step, transport and use of polymer, for safety and environmental considerations. It has also been found that the polymers obtained by this polymerization method are less efficient than polymers obtained by other polymerization method, all ingredients being equal (monomers nature, monomers ratio, etc. . . . ).

The most preferred methods of polymerization are emulsion polymerization and gel polymerization.

The polymerization is generally a free radical polymerization preferably by inverse emulsion polymerization or gel polymerization. By free radical polymerization, we include free radical polymerization by means of U.V. azoic, redox or thermal initiators and also Controlled Radical Polymerization (CRP) techniques or template polymerization techniques.

As already mentioned, the invention relates to a method for treating suspensions of solid particles in water. It involves mixing the suspension with the water-soluble polymer of the invention.

Such treatment can be carried out into a thickener, which is a holding area wherein the particles may settle at the bottom. According to a specific embodiment, the polymer is added into the pipe transporting the suspension to a thickener.

According to another specific embodiment, the polymer is added into a thickener that already contains the aqueous suspension of solid particles to be treated. In a typical mineral processing operation, tailings are often concentrated by flocculation process in a thickener to give higher density underflow, and to recover some of the process water. The addition of the polymer enhances the concentration of the underflow and increases the quality of the liquor.

According to another specific embodiment, the water-soluble polymer is added to the suspension of solid particles in water, during the transport of said suspension to a deposition area. Preferably, the polymer is added into the pipe transporting said suspension to a deposition area on which the treated suspension is spread off for dewatering and solidifying. Examples of such treatments include beach drying, and deep cell (accelerated dewatering). Another example of such treatment is the thin bed process which consists of spreading a fluidized treated suspension onto the ground in thin layer.

According to another specific embodiment, the water-soluble polymer is added to the suspension and then followed by a mechanical treatment such as centrifugation, screw press or filtration.

The water-soluble polymer may be added simultaneously at different stage of the suspension treatment, i.e. for example into the pipe transporting the suspension to a thickener and in the underflow of the thickener.

The polymer can be added in liquid form or in solid form. The polymer can be added as an emulsion (water in oil), a solution, a powder, or a dispersion of polymer in oil. The polymer is preferably added in an aqueous solution.

When the polymer is in a solid form, it can be partially or totally dissolved in water with the Polymer Slicing Unit (PSU) disclosed in WO 2008/107492.

According to another specific embodiment, the water-soluble polymer is added to the suspension in combination with another polymer, synthetic or natural. These at least two polymers can be added simultaneously or separately. The other polymer can be water-soluble or water swellable. It can be a dispersant, a coagulant or a flocculant.

According to another specific embodiment, the water-soluble polymer is added to the suspension in combination with a salt such as calcium and/or magnesium salts. The polymer and the salt can be added simultaneously or separately. Salts can be inorganic or organic. Suitable salts include calcium chloride, calcium acetate, calcium sulfate, calcium nitrate, calcium hydroxide, calcium carbonate, magnesium chloride, magnesium acetate, magnesium sulfate, magnesium nitrate, magnesium hydroxide, magnesium carbonate, calcium formate, calcium gluconate, calcium propionate, tricalcium phosphate and calcium succinate.

According to the invention, the total dosage of polymer added is between 50 and 5,000 g per ton of dry solids of suspension, preferably between 250 and 2,000 g/t, and more preferably between 500 and 1,500 g/t, depending on the nature and the composition of the tailings to be treated.

According to the invention, the method using the polymer described in the invention allows to treat more efficiently suspension of solid particles and more preferably of mineral material.

Suspensions of solid particles in water include all types of sludge, tailings, or waste materials. The suspensions may result from mineral ores processes. They may consist of, for instance, industrial sludge or tailings and all mine wash and waste products from exploiting mines, such as, for example, coal mines, diamonds mines, phosphate mines, metal mines (alumina, platinum, iron, gold, copper, silver, etc. . . . ). Suspensions are also drilling mud or tailings derived from the treatment of oil sand. These suspensions generally comprise organic and/or mineral particles such as for instance clays, sediments, sand, metal oxides, oil, etc. . . . , mixed with water.

Generally, suspensions of solid particles are concentrated, and contain between 5% and 60% in weight of solids, preferably between 20 and 50% in weight of solids, as compared to the total weight of said suspensions.

The method according to the invention is especially useful for the treatment of tailings resulting from oil sand extraction. The method is particularly useful for the treatment of fine tailings, Mature Fine Tailings (MFT), but may be also used to treat fresh tailings. According to an embodiment of the invention, the aqueous suspension of solid particles can be Mature Fine Tailings resulting from oil sand extraction.

The treatment of oil sand tailings has recently become an increasing issue in Canada. The tailings waste goes to tailings pond or thickeners for further water management.

The oil sands tailings are alkaline aqueous suspensions which contain un-recovered residual bitumen, salts, soluble organic compounds, sands and clays. The tailings are discharged to tailings ponds for storage.

The tailings ponds are also closely regulated by the government. Two to four barrels of fresh water are required per barrel of oil produced from the surface mining method. After the tailings slurry is discharged to the tailings ponds, the coarse solids segregate as the dykes while most of the water and fine solids remain as suspensions in the tailings pond. A layer of mature fine tails (MFT) develops after two to three years. MFT consolidates very slowly. The completion of the settling process is predicted to take almost a century.

The use of polymer described in the invention for treating MFT increases the performances in terms of net water release and yield strength of treated MFT.

Obviously, the following FIGURE and examples are only given to illustrate the subject matter of the invention, which is in no way restricted to them.

FIGURES

FIG. 1 relates to the preparation of the water-soluble polymer according to the invention, wherein the monomers M are polymerized in the presence of a multifunctional free radical transfer agent.

EXAMPLES

Example 1—Polymer Preparation (FIG. 1)

A 1.5 L reactor equipped with a mechanical stirrer, a thermometer and a nitrogen inlet is charged with 1050 g of distilled water, 317.14 g acrylamide (AM), 132.86 g acrylic acid (AA) and X g of partially hydrolyzed poly vinyl acetate (degree of hydrolysis 90%). X is calculated according to the following formula: $X (g) = [C]/450$, where [C] is the concentration of partially hydrolyzed poly vinyl acetate as a function of active monomers. [C] is expressed in ppm.

The resulting mixture is homogenized and then cooled, neutralized with sodium hydroxide to pH=7.6-7.7, and finally degassed under a nitrogen flow. The polymerization is then initiated using a redox system (initiator). The resulting, gel obtained after polymerization, is then grinded and dried in a drying oven so as to afford a powder.

The different polymers prepared according to the above method are listed in Table 1 below:

TABLE 1

Properties of polymer 1 to 15.

| Polymer | [C] (ppm) | Mw partially hydrolyzed poly vinyl acetate (g/mol) | UL viscosity (cps) |
|---|---|---|---|
| 1 | 0 | — | 6.16 |
| 2 | 1000 | 25,000-30,000 | 5.61 |
| 3 | 2000 | 25,000-30,000 | 5.51 |
| 4 | 5000 | 25,000-30,000 | 5.46 |
| 5 | 1000 | 120,000-130,000 | 5.76 |
| 6 | 2000 | 120,000-130,000 | 5.61 |
| 7 | 5000 | 120,000-130,000 | 5.46 |
| 8 | 10,000 | 120,000-130,000 | 5.00 |
| 9 | 15,000 | 120,000-130,000 | 5.10 |
| 10 | 20,000 | 120,000-130,000 | 5.00 |
| 11 | 25,000 | 120,000-130,000 | 5.30 |
| 12 | 30,000 | 120,000-130,000 | 4.30 |

TABLE 1-continued

Properties of polymer 1 to 15.

| Polymer | [C] (ppm) | Mw partially hydrolyzed poly vinyl acetate (g/mol) | UL viscosity (cps) |
|---|---|---|---|
| 13 | 35,000 | 120,000-130,000 | 4.40 |
| 14 | 40,000 | 120,000-130,000 | 4.40 |
| 15 | 50,000 | 120,000-130,000 | 5.05 |

Mw: Molecular Weight in g/mol.
UL Viscosity: Brookfield viscosity with UL module, 1 g/L in NaCl 1M at 25° C.

Example 2—Flocculation of Sludge 1 (MFT 1)

Polymers 1-7 are stirred into tap water in order to afford aqueous solutions having a concentration of 0.4 wt % of polymer with respect to the total weight of the solution. All of these solutions are mechanically stirred at 500 rpm until complete solubilization of the polymers and obtaining clear and homogeneous solutions. Flocculation tests have been carried out using Mature Fine Tailings (MFT) having a solid content of 33.7 wt %.

For each test, the appropriate volume of polymer solution was added into 200 g of MFT and then the whole mixture was mixed manually until flocculation and water release were observed.

Results displayed in Table 2 show that the use of partially hydrolyzed poly vinyl acetate of example 1 as multifunctional free radical transfer agent increases the water release from the flocculated sludge when compared to the reference (Polymer 1). Polymers prepared from partially hydrolyzed poly vinyl acetate having a molecular weight of 120,000-130,000 g/mol are more efficient than polymers prepared from partially hydrolyzed poly vinyl acetate having a molecular weight of 25,000-30,000. Significant improvements are obtained when [C] is around 5,000 ppm of HPVOH having a molecular weight of 120,000-130,000 g/mol (polymer 7).

TABLE 2

Performances of polymer 1 to 7 in terms of Net Water Release in MFT 1.

| Polymer | Polymer dosage (g/dry ton) | Water release (mL) | | | |
|---|---|---|---|---|---|
| | | 30 min | 1 h | 24 h | 24 h NWR |
| 1 | 1128 | 18.55 | 20.89 | 23.56 | 4.56 |
| 2 | 1128 | 23.01 | 27.47 | 32.24 | 13.24 |
| 3 | 1128 | 23.73 | 27.90 | 32.51 | 13.51 |
| 4 | 1128 | 23.14 | 27.51 | 32.32 | 13.32 |
| 5 | 1128 | 23.92 | 28.69 | 32.77 | 13.77 |
| 6 | 1128 | 24.37 | 29.32 | 32.50 | 13.50 |
| 7 | 1128 | 26.91 | 32.24 | 36.39 | 17.39 |

NWR = Net Water Release. It corresponds to the total amount of water recovered during the flocculation test.

Example 3—Flocculation of Sludge 2 (MFT 2)

Polymers 1 and 7-15 are stirred into tap water in order to afford aqueous solutions having a concentration of 0.4 wt % of polymer with respect to the total weight of the solution. All of these solutions are mechanically stirred at 500 rpm until complete solubilization of the polymers and obtaining clear and homogeneous solutions.

Flocculation tests have been carried out using Mature Fine Tailings (MFT) having a solid content of 35.1 wt %.

For each test, the appropriate volume of polymer solution was added into 200 g of MFT and then the whole mixture was mixed manually until flocculation and water release were observed.

Results displayed in Table 3 show that an optimum in partially hydrolyzed poly vinyl acetate dosage exists and strongly impacts the flocculation. In this particular case, polymer 12 containing 30,000 ppm of high molecular weight partially hydrolyzed poly vinyl acetate (120,000-130,000 g/mol) exhibits the best flocculating properties.

TABLE 3

Performances of polymer 1 and 7-15 in terms of Net Water Release in MFT 2.

| Polymer | Polymer dosage (g/dry ton) | Water release (mL) | | | |
|---|---|---|---|---|---|
| | | 30 min | 1 h | 24 h | 24 h NWR |
| 1 | 1009 | 12.45 | 15.46 | 19.55 | 2.55 |
| 7 | 1009 | 12.09 | 16.28 | 21.11 | 4.11 |
| 8 | 1009 | 12.31 | 14.82 | 20.04 | 3.04 |
| 9 | 1009 | 11.93 | 15.26 | 21.77 | 4.77 |
| 10 | 1009 | 16.95 | 19.83 | 25.58 | 8.58 |
| 11 | 1009 | 18.82 | 22.08 | 27.15 | 10.15 |
| 12 | 1009 | 23.76 | 27.79 | 32.80 | 15.80 |
| 13 | 1009 | 18.23 | 22.06 | 27.66 | 10.66 |
| 14 | 1009 | 17.33 | 22.02 | 26.96 | 9.96 |
| 15 | 1009 | 16.91 | 19.05 | 23.99 | 6.99 |

Example 4—Evidence of Improvement Due to the Comb-Like Macromolecular Architecture of the Water-Soluble Polymer Blend A is a mixture of 2 linear polymers (97 wt % of polymer 1+3 wt % of partially hydrolyzed poly vinyl acetate 120,000-130,000 g/mol). It has the same chemical composition as polymer 12, but polymer 12 has been prepared by polymerization of acrylamide and acrylic acid in the presence of partially hydrolyzed poly vinyl acetate. Polymer 12 has therefore a comb-like structure while polymer 1 and partially hydrolyzed poly vinyl acetate are linear polymers. Blend A has been mixed according to the method described in example 3 and carried out in order to flocculate sludge 2 having a solid content of 35.1 wt %.

Results presented in Table 4 show that the partially hydrolyzed poly vinyl acetate needs to be added to the monomers before the polymerization starts in order to initiate the comb-like macromolecular architecture. The blend of a linear flocculant (i.e. Polymer 1) and the unreacted partially hydrolyzed poly vinyl acetate exhibits the same dewatering properties as the sole flocculant (polymer 1).

TABLE 4

Performances of polymers 1, 12, and Blend A in terms of Net Water Release in MFT 2.

| Polymer | Polymer dosage (g/dry ton) | Water release (mL) | | | |
|---|---|---|---|---|---|
| | | 30 min | 1 h | 24 h | 24 h NWR |
| 1 | 1009 | 12.45 | 15.46 | 19.55 | 2.55 |
| 12 | 1009 | 23.76 | 27.79 | 32.80 | 15.80 |
| Blend A | 1009 | 10.52 | 14.55 | 20.34 | 3.34 |

The invention claimed is:
1. A method for treating an aqueous suspension of solid particles, comprising the following steps:
preparing a water-soluble polymer by polymerizing:
  at least one non-ionic monomer;
    optionally at least one anionic and/or at least one cationic monomer;

in the presence of from between 0.05% and 10% by weight, of at least one multifunctional free radical transfer agent, said weight percentage being related to the total amount of monomers; and adding said water-soluble polymer to the aqueous suspension of solid particles;

wherein the water-soluble polymer contains at least 30 mol % of the least one non-ionic monomer, and wherein said non-ionic monomer is selected from the group consisting of acrylamide; methacrylamide; N-mono derivatives of acrylamide; N-mono derivatives of methacrylamide; N,N derivatives of acrylamide; N,N derivatives of methacrylamide; acrylic esters; and methacrylic esters; and wherein the multifunctional free radical transfer agent is a polymer having a molecular weight ranging from between 2,000 g/mol and 500,000 g/mol, and is selected from the group consisting of; polyvinyl alcohol; polyvinyl alcohol copolymer; hydrolyzed vinyl acetate-based polymer; and hydrolyzed vinyl acetate-based copolymer.

2. The method according to claim 1, wherein the multifunctional free radical transfer agent is a partially hydrolyzed vinyl acetate-based polymer or a partially hydrolyzed vinyl acetate-based copolymer.

3. The method according to claim 2, wherein the degree of hydrolysis of the partially hydrolyzed vinyl acetate-based polymer or copolymer is between 60% and 99%.

4. The method according to claim 1, wherein the multifunctional free radical transfer agent is an ionic partially hydrolyzed vinyl acetate-based copolymer, said ionic copolymer comprising:

between 1 and 40 mol % of at least one anionic monomer relative to the total amount of monomers; and optionally at least one non-ionic monomer present at about 0 to 10 mol % relative to the total amount of monomers.

5. The method according to claim 1, wherein the amount of multifunctional free radical transfer agent is comprised between 0.1% and 6% by weight, as compared to the total weight of the monomers.

6. The method according to claim 1, wherein the water-soluble polymer is anionic and has an anionicity ranging from between 10 to 55 mol %.

7. The method according to claim 1, wherein the anionic monomer is selected from the group consisting of monomers having a carboxylic function; salts of monomers having a carboxylic function; monomers having a sulfonic acid function; salts of monomers having a sulfonic acid function; monomers having a phosphonic acid function; and salts of monomers having a phosphonic acid function.

8. The method according to claim 1, wherein the water-soluble polymer is obtained by emulsion polymerization or gel polymerization.

9. The method according to claim 1, wherein the polymer is added into a thickener containing the aqueous suspension of solid particles to treat.

10. The method according to claim 1, wherein the polymer is added to the aqueous suspension of solid particles during the transport of the said suspension to a deposition area.

11. The method according to claim 1, wherein the aqueous suspension of solid particles is a suspension resulting from mineral ores processes.

12. The method according to claim 1, wherein the aqueous suspension of solid particles is Mature Fine Tailings resulting from oil sand extraction.

13. The method according to claim 3, wherein the multifunctional free radical transfer agent is an ionic partially hydrolyzed vinyl acetate-based copolymer, said ionic copolymer comprising:

between 1 and 40 mol % of at least one anionic monomer relative to the total amount of monomers; and optionally at least one non-ionic monomer present at about 0 to 10 mol % relative to the total amount of monomers.

14. The method according to claim 13, wherein the amount of multifunctional free radical transfer agent is comprised between 0.1% and 6% by weight, as compared to the total weight of the monomers.

15. The method according to claim 13, wherein the water-soluble polymer is anionic and has an anionicity ranging from between 10 to 55 mol %.

16. The method according to claim 15, wherein the amount of multifunctional free radical transfer agent is comprised between 0.1% and 6% by weight, as compared to the total weight of the monomers.

* * * * *